US011358781B2

(12) United States Patent
Väin et al.

(10) Patent No.: US 11,358,781 B2
(45) Date of Patent: Jun. 14, 2022

(54) MOBILE ROBOT HAVING INSULATED BAG FOR FOOD DELIVERY

(71) Applicant: Starship Technologies OÜ, Tallinn (EE)

(72) Inventors: Lauri Väin, Tallinn (EE); Tommy Biene, Raplamaa (EE); Sylvia-Johanna Annus, Tallinn (EE); Piret Uustal, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 255 days.

(21) Appl. No.: 16/840,769

(22) Filed: Apr. 6, 2020

(65) Prior Publication Data
US 2020/0231366 A1 Jul. 23, 2020

Related U.S. Application Data

(63) Continuation of application No. 16/516,334, filed on Jul. 19, 2019, now Pat. No. 10,625,926, which is a (Continued)

(30) Foreign Application Priority Data

Jan. 20, 2017 (EP) .................................... 17152515

(51) Int. Cl.
*G06F 7/00* (2006.01)
*B65D 81/38* (2006.01)
(Continued)

(52) U.S. Cl.
CPC ......... *B65D 81/3897* (2013.01); *B65D 81/38* (2013.01); *B65D 81/389* (2013.01);
(Continued)

(58) Field of Classification Search
CPC ........................... B65D 81/3897; B65D 81/38; B65D 81/3888; B65D 81/389; G06Q 10/08;
(Continued)

(56) References Cited

U.S. PATENT DOCUMENTS 1,949,677 A 3/1934 Crawford
4,666,042 A 5/1987 Dlott et al.
(Continued)

FOREIGN PATENT DOCUMENTS

GB 2546583 A 7/2017

OTHER PUBLICATIONS

European Office Action dated Jul. 24, 2020, issued in EP counterpart application (No. 18700897.4).
(Continued)

*Primary Examiner* — Yolanda R Cumbess
(74) *Attorney, Agent, or Firm* — Womble Bond Dickinson (US) LLP

(57) ABSTRACT

An insulated bag reduces heat exchange between temperature-sensitive items and ambient surroundings. The insulated bag has a bag body which can be covered by a bag lid. The bag lid is provided with a first portion of a securing element. The insulated bag is suitable for insertion into an item space of a mobile delivery robot. The mobile robot has a robot lid provided with a complementary second portion of the securing element. After the insulated bag is inserted into the item space, the two portions of the securing element are connected. Thereafter, when the robot lid is opened, the bag lid is also opened, permitting access to its contents.

18 Claims, 6 Drawing Sheets

Related U.S. Application Data continuation of application No. PCT/EP2018/051028, filed on Jan. 16, 2018, which is a continuation of application No. 15/808,152, filed on Nov. 9, 2017, now Pat. No. 10,005,609.

(51) Int. Cl.
*H04Q 9/00* (2006.01)
*G06Q 10/08* (2012.01)

(52) U.S. Cl.
CPC ......... *B65D 81/3888* (2013.01); *G06Q 10/08* (2013.01); *H04Q 9/00* (2013.01); *H04Q 2209/30* (2013.01); *H04Q 2209/40* (2013.01); *H04Q 2209/823* (2013.01); *Y10S 901/01* (2013.01)

(58) Field of Classification Search
CPC .. H04Q 9/00; H04Q 2209/30; H04Q 2209/40; H04Q 2209/823; Y10S 901/01
USPC .............................. 700/213, 245; 340/870.09
See application file for complete search history.

(56) References Cited

U.S. PATENT DOCUMENTS

| | | |
|---|---|---|
| 4,673,117 A | 6/1987 | Calton |
| 4,871,597 A | 10/1989 | Hobson |
| 5,190,376 A | 3/1993 | Book |
| 5,857,778 A | 1/1999 | Ells |
| 6,015,072 A | 1/2000 | Young |
| 6,048,099 A | 4/2000 | Muffett et al. |
| 6,281,477 B1 | 8/2001 | Forrester et al. |
| 7,040,115 B1 | 5/2006 | Lopez et al. |
| 8,332,991 B2 | 12/2012 | Blaak et al. |
| 9,535,421 B1 | 1/2017 | Canoso et al. |
| 2006/0144844 A1 | 7/2006 | Kita |
| 2009/0158770 A1 | 6/2009 | Cohrs et al. |
| 2014/0254896 A1 | 9/2014 | Zhou et al. |
| 2015/0006005 A1 | 1/2015 | Yu et al. |
| 2015/0251319 A1 | 9/2015 | Ishikawa et al. |
| 2016/0104099 A1 | 4/2016 | Villamar |
| 2019/0317498 A1* | 10/2019 | Mere .................. G06Q 10/0832 |

OTHER PUBLICATIONS

International Search Report and Written Opinion dated Apr. 9, 2018, issued in PCT counterpart application (No. PCT/EP2018/051028).

* cited by examiner

MOBILE ROBOT HAVING INSULATED BAG FOR FOOD DELIVERY

RELATED APPLICATIONS

This is a Continuation of U.S. patent application Ser. No. 16/516,334, filed Jul. 19, 2019, now U.S. Pat. No. 10,625,926, which is a Bypass Continuation of International Application No. PCT/EP2018/051028, filed Jan. 16, 2018 and published as WO 2018/134209A1, which is a Continuation of U.S. patent application Ser. No. 15/808,152 filed Nov. 9, 2017, now U.S. Pat. No. 10,005,609. Priority is claimed to European Patent Application no. EPA 17152515.7 filed Jan. 20, 2017, in both PCT/EP2018/051028 and U.S. patent application Ser. No. 15/808,152. The contents of the aforementioned applications are incorporated by reference in their entirety.

FIELD

The invention relates to insulation of temperature-sensitive items. More specifically, the invention relates to insulation of items during delivery by a mobile robot to a recipient.

INTRODUCTION

Delivering goods is an ever growing industry around the world. Traditionally, delivery to the end customer is done by a courier. For example, many deliveries are transported by a truck or car and then brought to the front door by the driver. However, in the last few years, there have been many efforts to further automate the delivery industry, particularly last-mile delivery. Increasingly, customers prefer to receive their ordered items outside of normal working hours (as they may be working themselves), on the weekends and holidays, as well as on short notice. Therefore, eliminating the need for human drivers or couriers can provide several advantages from cost saving, to energy saving or delivery time optimization. One way to do it is to implement drones—flying robots capable of carrying a certain weight in items. However, drones present several large disadvantages. For one, noise pollution due to the drones' rotating blades is a growing concern. Another problem is the danger of a drone malfunctioning and crashing on to the ground, resulting in potential injuries or property damage. Several other disadvantages such as privacy concerns or the large energy expenditures also arise. Therefore, it is particularly desired to have alternatives for unmanned goods delivery. A promising alternative is ground-based delivery robots. Such robots can be relatively small, travel on sidewalks or other pedestrian walkways, and drive autonomously and/or semi-autonomously. Using a computer vision system based on several redundant sensors and sophisticated analysis algorithms, the mobile robots can navigate to their destination within a radius of a few kilometers, making them perfect candidates for autonomous last-mile delivery. The robots can be virtually silent, use little energy, be cheap to produce, and deliver items at any time convenient for the recipient.

A large and growing segment of the delivery industry is food delivery. This includes both grocery delivery, as well as meal delivery such as take-out. When delivering food, temperature changes can present a concern. That is, frozen or cold food should remain frozen during transport, and hot meals should remain hot. Therefore, it is preferred that food-containing items be insulated during transportation. Different ways of insulating food during transportation or storage are known and used, with several examples listed below.

U.S. Pat. No. 4,871,597 describes a light-weight multi-layer insulating enclosure comprised of four different layers of materials to provide maximum insulation for containers ranging from relatively rigid to relatively flexible construction. The improved insulating qualities of the present invention are achieved through the use of an inner-most fabric liner layer, a second inner-most insulating layer which includes a polymeric foam, a third inner-most metalized polymer film reflective layer, and an outer-most fabric mesh layer. The enclosure is light-weight, collapsible and removable.

U.S. Pat. No. 6,048,099 discloses a soft-sided insulative container including a base, a rear wall and three side walls extending upward from the base, and a cover. Each side wall has a side wall ear flexibly attached to it with a folding hinge to extend inward adjacent the cover. The cover has cover ears each flexibly attached to it with a folding hinge, and cover ears extend downward around all the peripheral edges of the cover. In a closed position, each unhinged edge between the cover and the side walls includes both a side wall ear and a cover ear in an overlapping configuration. The cover ears are temporarily secured to the side walls in this closed position. The base, the side walls, the cover, the side wall ears and the cover ears are formed of three layers of flexible material, including an inside layer, an outside layer, and a thermally insulative blanket. The inside layer and the outside layer are substantially waterproof.

U.S. Pat. No. 7,040,115 discloses an insulated container assembly, which has a main body portion and a lid hingedly attached to the main body portion. The main body portion has four walls and is substantially rectangular in shape. The walls of the main body portion define an area for receiving and holding food and beverages therein. The walls each have a slot extending therethrough. The lid has an interior surface having a rectangular indentation centered therein. A plurality of gel packs are inserted within the slots of each wall of the main body portion, and in the rectangular indentation of the lid, for keeping the area within the main body portion hot or cold.

Food insulation is also a growing requirement in the delivery industry. More and more customers prefer to order groceries online receive them at home at a convenient time. Among those groceries can be frozen goods such as frozen pizza, ice cream or vegetables, cooled goods such as meats, cheeses or beverages or even warm goods such as freshly baked goods. Additionally, meal delivery at home or at work is on the rise with many people opting for the convenience of a ready meal delivered to them within a short time. Delivery via autonomous means such as ground-based robots needs to address insulation as well in order to enter this market segment.

US patent application 2015/0006005 A1 describes an autonomous unmanned road vehicle and how it can be used to make deliveries. The unmanned vehicle is capable of operating autonomously on paved roadways. The vehicle has a control system for autonomous driving and a perception system for detecting objects in its surroundings. The vehicle also has one or more cargo compartments for carrying the delivery items. In some cases, the vehicle has a cold compartment that is thermally insulated and/or cooled, and the container holding the cold food item is loaded into the cold compartment. In some cases, the container for the cold food item is reusable, and after making the delivery, the vehicle stands by and waits until the container is returned to the vehicle, and departs afterwards.

In the case of autonomous delivery via robots, recipient convenience adds another layer of complexity to autonomous food delivery. Autonomous delivery devices do not have human drivers that can remove the item from the insulating storage space where it is located during transport and hand it over to the recipient. Therefore, the recipient would need to do it on their own. As the device or robot needs to be locked during transport to prevent access by unauthorized persons, the recipient would need to first access the locked storage compartment, and then further access the insulated storage. This can result in inconvenience for the recipient.

Furthermore, when transporting food or meals, it is possible for some spillage, leakage or staining to occur, resulting in food or beverages staining the storage space. Not only can this result in undesired smells or unsightly stains, but it can be hygienically unsafe for the next recipients if the storage space is reused without thoroughly cleaning it first.

SUMMARY

In light of the above, it is the object of the present invention to disclose an insulated bag or container for a mobile robot. It is also the object of the present invention to disclose a bag or container specifically adapted to fit inside a mobile robot and adapted to be conveniently accessed when removing goods such as temperature sensitive items from the mobile robot. It is further the object of the present invention to disclose a bag or container with an easily removable outer layer adapted to be easily washed and sanitized and which improves the hygienic standing of the insulated container.

Note, that in the present document, the word "item" as referring to objects placed within the insulated container can refer to any temperature sensitive items or objects. For example, the word item can refer to food, drinks, take-out, meals, frozen goods, medicine, supplements, ice and/or other temperature sensitive objects.

Also note, that the insulated bag or container can also be referred to as an insulating bag or container or box.

The present invention is specified in the claims as well as in the below description. Preferred embodiments are particularly specified in the dependent claims and the description of various embodiments.

In a first embodiment, the invention discloses an insulated bag for reducing heat exchange between temperature-sensitive items and ambient surroundings, preferably for use in a delivery robot. The insulated bag comprises a bag body comprising a body inner surface, a body outer surface and a body cavity. The insulated bag further comprises a bag lid comprising a bag lid inner surface and a bag lid outer surface. The bag lid is adapted to assume at least an open and a closed positions. The closed position comprises the bag lid fitting on the bag body, so as to prevent access to the body cavity. The open position comprises the bag lid positioned so as to allow access to the body cavity. The insulated bag also comprises a securing element adapted to releasably attach the bag lid to another surface or vice versa. Thus, the securing element can releasably attach the bag lid to an overlying surface not belonging to the insulated bag, such that raising the overlying surface also raises the bag lid.

In some embodiments, at least one of the bag body and the bag lid can comprise at least one inner layer adapted to reduce conductive heat transfer between the body cavity and the ambient surroundings. That is, such an inner layer can comprise a material with a low thermal conductivity. For example, the inner layer can comprise a foam-based material, such as aerofoam. Additionally or alternatively, the inner layer can comprise aerogel-based insulating material. In some embodiments, the inner layer can comprise one or more layers of vacuum and/or one or more layers of air.

The inner layer can comprise thermal conductivity of 0.03 to 0.05 W/mK, preferably of 0.03 to 0.04 W/mK. This can correspond to typically available foam-based materials such as foam-based insulating materials. Those can be particularly advantageous due to ease of manufacturing. Materials with aerogel and/or vacuum-based insulation can comprise a lower thermal conductivity such as below 0.02 W/mK and/or below 0.01 W/mK. This is advantageous for better insulation, but can result in more involved manufacturing processes, reducing the overall efficiency of the insulated bag.

In some embodiments, the inner layer can comprise a thickness of 1 to 10 mm, preferably 2 to 8 mm, more preferably 3 to 7 mm, such as around 4 to 6 mm. This range can be particularly advantageous, as it provides an optimization between maximizing the volume of the insulating bag (which is increased by thinner inner layer) and minimizing the heat exchange with the ambient surroundings of the insulated bag (which is reduced by thicker inner layer). For example, in embodiments where the insulated bag is used within a mobile robot for insulating temperature sensitive items, a thickness of the inner layer of about 5 mm can result in an average temperature change of 5 to 15° C. over 30 minutes for said items. Note, that this is a one example, and should only be considered as a rough reference. Precise temperature change can depend on several factors including ambient temperature, mass of the temperature sensitive item and other factors.

In some other embodiments, the inner layer can comprise a thickness of 10 to 50 mm, preferably 20 to 40 mm, more preferably 25 to 35 mm. Compared to the embodiment described above, the thickness on the inner layer here is several fold greater. This can mean that the rate of heat exchange between the inside of the insulated bag and the ambient surroundings is decreased. For example, a thickness of about 30 mm can result in an average temperature change of 1 to 5° C. over 30 minutes for items stored within the insulated bag. Again, this is a rough estimate and should not be interpreted in a binding way. The larger thickness of the inner layer can result in reduced volume available within the bag body of the insulated bag. Therefore, it can be advantageous to have two or more versions of the insulated bag: one with a lower thickness of 1 to 10 mm and one with a higher thickness of 10 to 50 mm. The thinner version can be used for less temperature sensitive items and/or for shorter heat exchange times (that can mean, when the insulated bag is used as part of a delivery robot, shorter delivery times), and the thicker version can be used for more temperature sensitive items and/or for longer delivery times.

In some embodiments, the insulated bag can comprise a plurality of inner layers, such as two or more inner layers. Each of the inner layers can be as described above. This can be advantageous, as two distinct but connected inner layers can provide better insulation than one thicker inner layer. That can be due to the layer of air between the two inner layers providing additional insulation. Furthermore, it may be easier and more efficient to manufacture or procure thinner inner layers such as inner layers with a thickness of about 5 to 10 mm and combine then as needed, rather than manufacture or procure thicker inner layers.

In some embodiments, at least one of the bag body and the bag lid can comprise at least one intermediate layer adapted to reduce radiative heat transfer between the body cavity and the ambient surroundings. That is, the intermediate layer can comprise a material with a high reflective coefficient (or reflexivity and/or reflectance). In some embodiments, the intermediate layer can comprise a metallic laminate, preferably an aluminum foil laminate. Such a material can comprise a reflective coefficient of at least 90%, such as at least 95%, preferably at least 97%.

In embodiments where the inner layer is present, the intermediate layer can be laminated on both sides of the inner layer. This can be advantageous, as a very thin intermediate layer can be sufficient for the purposes of restricting radiative heat transfer.

Note, that the intermediate layer can also contribute to reducing conductive heat transfer.

In some embodiments, the bag body and the bag lid can comprise at least one outer layer. The outer layer can be adapted to be removed and/or replaced. That is, the outer layer can be manufactured in such a way that it can be put on or taken off the insulated bag multiple times. This can be particularly advantageous in embodiments where the insulated bag can be used for delivery of items such as food and/or drinks. Those items can spill and/or otherwise leave traces in the insulated bag. Various hygiene, health and cleanliness considerations can mean that it is preferable to wash and/or otherwise clean the inside of the bag body of the insulated bag on a regular basis and/or after particular spills. Therefore, it can be practical to have an outer layer on the bag that can be removed and washed and/or otherwise cleaned without having to wash and/or clean the whole bag (which can be cumbersome depending on the overall shape, other components and/or materials of the insulated bag).

The outer layer can comprise a material that is slightly hydrophobic to contain any spills.

In some embodiments, the outer layer can comprise a polymer material such as polyamide, nylon polypropylene and/or polyester. A nylon based material can be particularly advantageous, as it is widely available, easy to manufacture and/or work with, easy to wash and reuse afterwards. Furthermore, it can be durable and contribute to a longer lifetime of the insulated bag.

In some embodiments, the outer layer is adapted to cover the body inner surface and at least a part of the body outer surface. That is, the outer layer need not be present around all of the body surface. As the outer layer can primarily serve to protect the insulated bag from spills, it is advantageous for it to cover all of the body inner surface. However, it need not cover all of the body outer surface. In fact, it can be advantageous for the outer layer to only cover a part of the body outer surface. In such embodiments, it can be easier to remove and put the outer layer back on.

In some other embodiments, the outer layer covering the body inner surface of the insulated bag can comprise nylon or a similar polymer material, and the outer layer covering all or part of the body outer surface can comprise an elastic material that can be easily placed on or removed from the insulated bag. Furthermore, in some preferred embodiments, the material covering or lining the body outer surface can be a low static material. That is, it can be a material that does not allow (or does not significantly allow) for build-up and discharge of static electricity. This can be particularly advantageous, as electrostatic discharge (ESD) can damage or even break sensitive electronics. In embodiments where the insulated bag is used within a mobile robot for item delivery, the mobile robot can comprise a plurality of sensitive electronic components such as sensors for navigation and localization, processing and communication components and so on. To avoid damaging these components by ESD, it can be advantageous to cover the body outer surface with a low static material, so that vibration due to the robot moving as well as removal and replacement of the insulated bag do not lead to dangerous electricity discharges. That is, in such embodiments, the outer layer of the insulated bag can comprise two distinct materials sewn or otherwise joined together. The body inner surface can be covered or lined with a polymer material such as nylon, and the body outer surface can be covered or lined with a low static elastic material such as a cotton-based material (potentially with elastane, Lycra, or another material added for stretchiness or elasticity purposes).

In some embodiments, the outer layer covering or lining the body inner surface is adapted to be attached to and detached from the insulated bag. This can be implemented by a fastener such as a zipper. In other words, the outer layer of the insulated bag can comprise a zipper that, when unzipped, allows the removal of all or most of the outer layer covering or lining the body inner surface. This is advantageous, as this is the part of the insulated bag that is most likely to get stained or otherwise contaminated by the items transported within the insulated bag. In this way, the inside lining of the bag can be removed and washed and/or otherwise disinfected or cleaned, and then reattached without removing all of the inner layer of the insulated bag. Instead of a zipper, other fasteners can be used, such as "hook-and-loop" fasteners (e.g., VELCRO®), buttons, or other means of removable attaching mechanisms can be used. Note, that in embodiments where the inner layer comprises distinct materials on the body inner surface and the body outer surface, the attaching mechanism can be the border between the two.

A securing element can be provided on the insulated bag to releasably attach the bag lid to an overlying surface not belonging to the insulated bag, such that operating the overlying surface also operates the bag lid. In some embodiments, the securing element of the insulated bag comprises a minimum length of at least 1 cm, more preferably of at least 2 cm, even more preferably of at least 3 cm. The securing element can have one end fixedly attached to the bag lid, and the other end free to attach the bag lid to another surface. That is, the minimum length of the securing element can refer to the length between the attached ends, that is, the maximum distance between the bag lid and the surface it is attached to via the securing element.

In some embodiments, the securing element can comprise sticky tape. The sticky tape can be flexible and/or stretchy.

The securing element can also comprise a suction cup. That is, the securing element can be fixedly attached to the bag lid, for example via a fastening of some kind and/or a gluing and/or sewing, and further comprise a thread and/or a cord and/or a strap and/or a ribbon (any of which can also be flexible and/or stretchy) with a suction cup at the end of the thread. Note, that the thread or other means of extending the securing element is optional and the securing element can simply comprise a suction cup fixedly attached to the bag lid.

In other embodiments, the securing element can comprise a hook and loop fastener. For example, the securing element can comprise a VELCRO®-based fastener. That is, the securing element can comprise a piece of VELCRO®, say the hook side. The loop side can then be fixedly attached to the bag lid via gluing, sewing and/or other means. Alternatively, the VELCRO® strip can be simply fixedly attached to the lid via one of its ends, leaving the other end free. In this embodiment, the securing means can removably attach the bag lid to any surface comprising a corresponding VELCRO® piece (here, the loop side). This fastening can be advantageous, as the VELCRO® strip can allow the securing element to have varied length.

In other embodiments, the securing element can comprise a button such as a push-button and/or a snap fastener. As before, the button can be attached to a strip and/or a thread and/or a cord and/or a strap and/or a ribbon (any of which can be flexible and/or stretchy) that is fixedly attached to the bag lid. Releasable attachment with another surface would require, as before, the corresponding part of the fastener (such as a loop for a button and/or half of the snap fastener) to be attached to the surface to which the bag lid is to be removably attached.

In some preferred embodiments, the securing element can be adapted to withstand a force equal to at least the gravitational force acting on the bag lid. That is, once the securing element is fastened or otherwise removably attached, the bag lid can be supported by this connection to another surface. The bag lid can then be moved by moving the other surface. For example, the bag lid can be opened and/or closed by moving the other surface. The securing element then would remain in place and support the lid against the gravitational force acting on it. The securing element is adapted to withstand a force of at least 5 N, preferably at least 10 N, more preferably at least 20 N. This can correspond to at least the gravitational force acting on the bag lid. Note, that preferably, the securing element can also withstand a force exceeding the gravitational force acting on the lid. This is advantageous, as moving the lid via the other surface it is connected to by the securing element would apply an additional force on the lid, and the securing element should preferably be able to withstand this additional force.

In some embodiments, the securing element comprises elastic material. This can add additional flexibility and margin of error to the attachment between the bag lid and the other surface via the securing element.

In some embodiments, the insulated bag according to the preceding embodiment further comprises flaps attached to the body inner surface between the body cavity and the bag lid. The flaps can be adapted to at least partially cover at least part of the body cavity in the closed position of the bag lid. The flaps can be adapted to at least partially fold away from the body cavity in the open position of the bag lid.

That is, the flaps can contribute to the isolation of the isolating bag by adding an extra layer to the area where the bag lid meets with the bag body, said area being particularly vulnerable to heat exchange with ambient surroundings.

The flaps can be manufactured in a way that allows them to fold as the bag lid is opened and unfold as the bag lid is closed. That is, when the bag lid is open, the flaps can fold towards the walls of the bag body so as to allow unencumbered or at least easier access to the body cavity. When the bag lid is closed, the flaps can unfold across the body cavity or partially across the body cavity so as to add insulation to the insulated bag.

In some embodiments, the flaps are at least partially connected with the lid inner surface of the bag lid. That is, the flaps can be glued, sewn or otherwise attached or partially attached to the lid inner surface. This can facilitate the flaps folding and unfolding with the opening and closing of the bag lid. The flaps can be connected with the lid inner surface via a connection. The connection can comprise sewing, an inlay, and/or a piece of material that attached the flaps to the lid inner surface.

In some embodiments, the flaps can comprise at least one inner layer adapted to reduce conductive heat transfer between the body cavity and the ambient surroundings. The inner layer can comprise a foam-based material. For example, the inner layer can comprise polyethylene foam.

The inner layer can comprise thermal conductivity of at least 0.01 W/mK, preferably at least 0.02 W/mK, more preferably at least 0.03 W/mK and at most 0.1 W/mK, preferably at most 0.06 W/mK, more preferably at most 0.04 W/mK. Thermal conductivity in those ranges can be particularly advantageous, as it provides sufficient isolation without requiring significant manufacturing efforts and expenditures (such as, for example, in the case of vacuum-based insulation).

The inner layer can comprise a thickness of 1 to 10 mm, preferably 2 to 8 mm, more preferably 3 to 7 mm, such as around 4 to 6 mm. Thicker inner layer can lead to less volume available for items within the insulated bag (provided the total volume and/or dimensions of the insulated bag are restricted). However, thinner inner layer can lead to less total insulation of the insulated bag. The above preferred thickness ranges can provide sufficient insulation so that the items within the delivery bag do not change the temperature by more than about 10° C. over a period of about 30 minutes. The inner layer of the flaps can comprise all the features of the inner layer of the bag body and/or bag lid and vice versa. The inner layer of the flaps can also be thinner than the inner layer of the bag body and/or of the bag lid. This can be advantageous to allow the flaps to fold and unfold with the movement of the bag lid, as thicker flaps can be harder to manipulate in this way.

The flaps can comprise at least one intermediate layer adapted to reduce radiative hear transfer between the body cavity and the ambient surroundings. The intermediate layer can comprise a metallic laminate, preferably an aluminum foil laminate. The intermediate layer can be laminated on both sides of the inner layer if it is present in the flaps. The intermediate layer of the flaps can comprise any of the features described in relation to the intermediate layer of the bag body and/or the bag lid.

The flaps can comprise at least one outer layer adapted to be easily removed and/or replaced. The outer layer can comprise a polymer material such as polyamide, nylon, polypropylene and/or polyester. The outer layer of the flaps can comprise any features and/or properties of the outer layer of the bag body and/or of the bag lid.

The insulated bag can further comprise at least one compartment located on the body inner surface and/or on the lid inner surface. The compartment can comprise a pocket located in the outer layer of the body inner surface. Additionally or alternatively, the compartment can comprise additional material glued, sewn or otherwise attached to the body inner surface (that is, the compartment can be on the outer layer or between the outer layer and the inner layer).

The compartment can be adapted to hold a heating and/or cooling element. That is, the compartment can be shaped in a way so as to firmly hold a standard heating and/or cooling element. The compartment can comprise a length and height of 10 to 20 cm.

The compartment can be adapted to conceal the heating and/or cooling element. That is, for aesthetic or other considerations, it can be advantageous to conceal or mask the heating and/or cooling element from the delivery recipient that reaches into the insulated bag to retrieve their item and/or items. In the case where the compartment comprises a pocket attached to, sewn onto or glued onto the outer layer, the heating and/or cooling element can be concealed simply by being placed inside such a pocket. The pocket can also comprise a simple closing means such as a VELCRO®-based fastener.

In preferred embodiments, the insulated can comprise a volume of 50 to 80 liters. This can be particularly advantageous when the insulated bag is used as part of a delivery robot, as it allows sufficient place for temperature sensitive items to be placed, but does not require significant increase in preferred dimensions of such a delivery robot.

The insulated bag can comprise a length of about 30 to 80 cm, preferably 30 to 70 cm, more preferably about 35 to 50 cm. The insulated bag can comprise a width of about 20 to 70 cm, preferably 20 to 60 cm, more preferably 30 to 50 cm. The insulated bag can also comprise a height of about 20 to 60 cm, preferably 20 to 50 cm, more preferably 30 to 50 cm. As above, those dimensions can be particularly preferable for use in conjunction with a delivery robot.

The insulated bag can further comprise at least one separating wall adapted to removably attach to the bag body of the insulated bag. The wall can comprise same or similar material as the insulated bag, or the wall can comprise a different material such as plastic. The wall can be attached to the insulated bag via VELCRO® or similar means or removable attachment. The wall or a plurality of walls can be particularly advantageous for delivering items that are preferably separated during delivery—such as meals and beverages for example. Additionally or alternatively, the wall or walls can be used to separate frozen goods from cold goods for groceries delivery. The part of the insulated bag comprising frozen goods could then further comprise additional cooling/heating packs and/or other means of temperature regulation.

In some embodiments, the separating walls can be placed in the insulated bag horizontally or vertically (that is, substantially horizontally and substantially vertically), or horizontal or vertical configurations. This can be advantageous, as depending on the items to be delivered, it can be advantageous to have several layers within the insulated bag or have several compartments. Furthermore, the walls can be adapted to be placed both horizontally and vertically, for example to separate three or more types of items to be delivered (such as for example a warm meal, a warm soup, and a cold beverage). The separating walls can also serve to create a plurality of levels within the insulated bag, for example for a plurality of pizzas, each placed on its own level and separated by a horizontal separating wall from the other levels.

In some embodiments, the insulated bag can further comprise a sensor. There can also be a plurality of sensors such as two sensors. The sensor can be adapted to measure at least one of temperature and humidity inside the insulated bag. There can be one sensor to measure temperature and another to measure humidity. The sensor can be attached to the inside of the insulated bag, for example to the flaps if they are present, to the bag lid, or to the body inner surface. The sensor can also be concealed in a separate compartment. The sensor can comprise a thermocouple sensor. Having a sensor inside the insulated bag can be particularly advantageous, as the temperature inside can be closely monitored. Some temperature sensitive items are regulated to be stored at certain temperature ranges to avoid safety concerns (for example, frozen goods can be regulated to be stored at a temperature below a certain threshold). In a second embodiment, the invention discloses a mobile robot adapted to deliver temperature-sensitive items to recipients. The robot comprises a robot body comprising a robot item space. The robot further comprises a robot lid adapted to assume at least an open and closed positions. The robot lid is adapted to tightly fit on top of the robot body in the closed position, so as to cover the robot item space. The robot lid is adapted to be lifted to the open position, so as to allow better access to the robot item space. The robot further comprises an insulated bag adapted to be fitted within the robot item space. The insulated bag comprises a bag body comprising a body inner surface, a body outer surface and a body cavity. The insulated bag also comprises a bag lid comprising a lid inner surface and a lid outer surface adapted to assume at least an open and a closed positions. The bag lid is adapted to snugly fit on top of the bag body in the closed position, so as to cover the body cavity. The bag lid is adapted to be lifted to the open position, so as to allow better access to the body cavity. The bag lid is adapted to assume an open position when the robot lid assumes an open position. The bag lid is adapted to assume a closed position when the robot lid assumes a closed position.

Note, that the expression "fit on the robot body" refers to the robot lid covering the robot body so as to fully cover the robot package space within the robot body and to not be dislodged by any little movement of the robot. It should not be taken to refer to hermetic seal or another strong seal.

Further note that "snugly fit on top of the bag body" refers to the bag lid being in contact with the bag body when in the closed position. As one of the functions of the insulated bag is to prevent or slow down heat exchange between the inside of the insulated bag and ambient surroundings, the "snug fit" is advantageous to avoid excessive heat exchange in the areas between the bag lid and the bag body.

The insulated bag of this second embodiment can comprise any of the features described in connection with the first embodiment above.

The robot can be an autonomous and/or semi-autonomous robot. That is, the robot can be adapted to autonomously and/or semi-autonomously deliver goods to recipients by travelling from a first location to one or more delivery locations. Semi-autonomous can refer here to the robot being controlled by a remote operator for some part of the delivery process. For example, the robot can be controlled or at least supervised by a remote operator when crossing car roads.

The robot can be adapted to navigate on pedestrian walkways. That is, the robot can travel on sidewalks, paths or other walkways accessible for pedestrians and/or bicycles, but not accessible for cars.

In some embodiments, the robot including the load can weigh no more than 40 kg. That is, the robot and the items to be delivered can weigh no more than 40 kg. This can be advantageous in case of accidental collision with pedestrians and/or animals, as they are not likely to be harmed.

In some embodiments, the robot is adapted to travel with a speed of no more than 20 km/h, or no more than 15 km/h, or no more than 10 km/h, preferably between 3 and 8 km/h or, more preferably, between 3 and 5 km/h. That is, the robot can be adapted to travel at speeds corresponding to pedestrian speeds. This is also advantageous in case of accidental collisions and can contribute to orderly traffic for all of the users of a pedestrian walkway.

The robot can comprise the following dimensions: width of 40 to 70 cm, such as about 55 cm, height of 40 to 70 cm, such as about 60 cm, length of 50 to 80 cm, such as about 65 cm. This size can also be particularly beneficial for travel on pedestrian walkways, as the robot does not take too much space.

The robot can further comprise at least four wheels, preferably at least six wheels.

The robot can further comprise a lock comprising at least one unlocked and at least one locked configurations. In the open configuration, the robot lid can be lifted so as to allow access to the item space. In the closed configuration, the robot lid cannot be lifted without damaging the robot lid and/or the robot body and/or the lock. The lock can serve to prevent unauthorized access to the robot package space. The intended recipient of the delivery can have the means to open the lock of the robot, such as a code or a command to be entered on a personal mobile device.

The robot lid can be adapted to open when the mobile robot reaches the item recipient. This can be practical, as the recipient can simply reach into the robot package space without first opening the robot or entering any commands.

The robot can further comprise a container adapted to be fitted within the robot item space and adapted to fit the insulated bag. The container can comprise a rigid basket. Such a container can provide additional insulation for the items within the insulated bag. Further, in embodiments where the insulated bag comprises a softer material, the container can provide rigid boundaries between the robot and the insulated bag. This can be advantageous in case of large spills. Without the container in-between, the spill could reach the electronics of the robot and damage it. The container can be further advantageous, as it can be fixedly or removably attached to the robot and prevent unauthorized persons from accessing the inside of the robot.

In some embodiments, the robot lid comprises a robot lid inner surface, and the insulated bag can further comprise a securing element adapted to attach the bag lid to the robot lid inner surface. The securing element can be as described above or below. This embodiment is particularly advantageous, as it allows the bag lid to follow the robot lid without requiring electronic controls or involved additional elements. It can also be advantageous for the securing element to comprise a certain minimum length, allowing for space between the bag lid and the robot. This space comprising air can limit heat exchange between the two lids.

In embodiments where a sensor is further present inside the insulated bag, the sensor can be further adapted to send its measurements to the robot for processing. That is, the sensor can communicate via a wired or wireless connection with the mobile robot. The mobile robot preferably comprises a processing component that can receive the sensor measurements and process them. The robot can be adapted to send out an alert signal if the sensor's measurements are not within predefined ranges. That is, if the sensor comprises a temperature sensor, the robot can be adapted to send out an alert signal if the temperature falls below or exceeds a certain threshold value. This value can depend on the specific items stored within the insulated bag. The robot can send out an alert to a remote server that can log it and send back a command with further instructions.

In a third embodiment, use of the invention is disclosed. The invention can be used for reducing heat exchange between temperature sensitive items and the ambient surroundings. Particularly, the invention can be used when a mobile robot travels to deliver temperature sensitive items to recipients.

The present invention is also defined by the following numbered embodiments.

Below is a list of device embodiments. Those will be indicated with a letter "A". Whenever such embodiments are referred to, this will be done by referring to "A" embodiments.

A1. An insulated bag (1) for reducing heat exchange between temperature-sensitive items and ambient surroundings, preferably for use in a delivery robot (1000), said insulated bag (1) comprising
a bag body (2) comprising a body inner surface (22), a body outer surface (24) and a body cavity (26);
a bag lid (4) comprising a lid inner surface (42) and a lid outer surface (44) adapted to assume at least an open and a closed positions and wherein
the closed position comprises the bag lid (4) fitting on the bag body (2), so as to prevent access to the body cavity (26); and
the open position comprises the bag lid (4) positioned so as to allow access to the body cavity (26);
securing element (40) adapted to releasably attach the bag lid (4) to another surface or vice versa.

A2. An insulated bag (1) according to the preceding embodiment wherein at least one of the bag body (2) and the bag lid (4) comprise at least one inner layer (16) adapted to reduce conductive heat transfer between the body cavity (26) and the ambient surroundings.

A3. An insulated bag (1) according to the preceding embodiment wherein the inner layer (16) comprises a foam-based material.

A4. An insulated bag (1) according to any of the preceding embodiments and with features of embodiment A2 wherein the inner layer (16) comprises thermal conductivity of 0.03 to 0.05 W/mK, preferably of 0.03 to 0.04 W/mK.

A5. An insulated bag (1) according to any of the preceding embodiments and with features of embodiment A2 wherein the inner layer (16) comprises a thickness of 1 to 20 mm, preferably 2 to 15 mm, more preferably 5 to 13 mm, such as around 6 to 12 mm.

A6. An insulated bag (1) according to any of the preceding embodiments and with features of embodiment A2 wherein the inner layer (16) comprises a thickness of 10 to 50 mm, preferably 20 to 40 mm, more preferably 25 to 35 mm.

A7. An insulated bag (1) according to any of the preceding embodiments and with features of embodiment A2 wherein at least one of the bag body (2) and the bag lid (4) comprise at least one further inner layer (16), said further inner layer (16) according to any of the preceding embodiments A3 to A6.

A8. An insulated bag (1) according to any of the preceding embodiments wherein at least one of the bag body (2) and the bag lid (4) comprise at least one intermediate layer (14) adapted to reduce radiative heat transfer between the body cavity (26) and the ambient surroundings.

A9. An insulated bag (1) according to the preceding embodiment wherein the intermediate layer (14) comprises a metallic laminate, preferably an aluminum foil laminate.

A10. An insulated bag (1) according to any of the preceding embodiments and with features of embodiments A2 and A8 wherein the intermediate layer (14) is laminated on both sides of the inner layer (16).

A11. An insulated bag (1) according to any of the preceding embodiments wherein at least one of the bag body (2) and the bag lid (4) comprise at least one outer layer (12) adapted to be removed and/or replaced.

A12. An insulated bag (1) according to the preceding embodiment wherein the outer layer (12) comprises a polymer material such as polyamide, nylon polypropylene and/or polyester.

A13. An insulated bag (1) according to any of the preceding embodiments and with features of embodiment A11 wherein the outer layer (12) comprises a low static elastic material such as cotton-based material.

A14. An insulated bag (1) according to the preceding embodiment and with features of embodiment A12 wherein the outer layer (12) comprises the polymer material covering the body inner surface (22) and the low static elastic material covering the body outer surface (24).

A15. An insulated bag (1) according to any of the preceding embodiments and with features of embodiment A11 wherein the outer layer (12) is adapted to cover the body inner surface (22) and at least a part of the body outer surface (24).

A16. An insulated bag (1) according to the preceding embodiment wherein the outer layer (12) covering the body inner surface (22) is adapted to be attached to and detached from the insulated bag (1) by a mechanism such as a zipper.

A17. An insulated bag (1) according to any of the preceding embodiments wherein the securing element (40) comprises a minimum length of at least 1 cm, more preferably of at least 2 cm, even more preferably of at least 3 cm.

A18. An insulated bag (1) according to any of the preceding embodiments wherein the securing element (40) comprises sticky tape.

A19. An insulated bag (1) according to any of the preceding embodiments wherein the securing element (40) comprises at least one suction cup.

A20. An insulated bag (1) according to any of the preceding embodiments wherein the securing element (40) comprises a hook and loop fastener.

A21. An insulated bag (1) according to any of the preceding embodiments wherein the securing element (40) comprises a button such as a push-button and/or a snap fastener.

A22. An insulated bag (1) according to any of the preceding embodiments wherein the securing element (40) is adapted to withstand a force equal to at least the gravitational force acting on the bag lid.

A23. An insulated bag (1) according to any of the preceding embodiments wherein the securing element (40) is adapted to withstand a force of at least 5 N, preferably at least 10 N, more preferably at least 20 N.

A24. An insulated bag (1) according to any of the preceding embodiments wherein the securing element (40) comprises elastic material.

A25. An insulated bag according to any of the preceding embodiments further comprising flaps (6) attached to the body inner surface (22) between the body cavity (26) and the bag lid (4) and wherein
   the flaps (6) are adapted to at least partially cover at least part of the body cavity (26) in the closed position of the bag lid (4); and
   the flaps (6) are adapted to at least partially fold away from the body cavity (26) in the open position of the bag lid (4).

A26. An insulated bag (1) according to the preceding embodiment wherein the flaps (6) are at least partially connected with the lid inner surface (42) of the bag lid (4).

A27. An insulated bag (1) according to the preceding embodiment wherein the flaps (6) are connected with the lid inner surface (42) via a connection (62).

A28. An insulated bag (1) according to any of the preceding embodiments and with features of embodiment A21 wherein the flaps (6) comprise at least one inner layer (16) adapted to reduce conductive heat transfer between the body cavity (26) and the ambient surroundings.

A29. An insulated bag according to the preceding embodiment wherein the inner layer (16) comprises a foam-based material.

A30. An insulated bag according to embodiment A28 wherein the inner layer (16) comprises thermal conductivity of at least 0.01 W/mK, preferably at least 0.02 W/mK, more preferably at least 0.03 W/mK and at most 0.1 W/mK, preferably at most 0.06 W/mK, more preferably at most 0.04 W/mK.

A31. An insulated bag (1) according to embodiment A28 wherein the inner layer (16) comprises a thickness of 1 to 10 mm, preferably 2 to 8 mm, more preferably 3 to 7 mm, such as around 4 to 6 mm.

A32. An insulated bag (1) according to any of the preceding embodiments and with features of embodiment A25 wherein the flaps (6) comprise at least one intermediate layer (14) adapted to reduce radiative hear transfer between the body cavity (26) and the ambient surroundings.

A33. An insulated bag (1) according to the preceding embodiment wherein the intermediate layer (14) comprises a metallic laminate, preferably an aluminum foil laminate.

A34. An insulated bag (1) according to any of the preceding embodiments and with features of embodiment A32 wherein the intermediate layer (14) is laminated on both sides of the inner layer (16).

A35. An insulated bag (1) according to any of the preceding embodiments and with features of embodiment A21 wherein the flaps (6) comprise at least one outer layer (12) adapted to be easily removed and/or replaced.

A36. An insulated bag (1) according to the preceding embodiment wherein the outer layer (12) comprises a polymer material such as polyamide, nylon, polypropylene and/or polyester.

A37. An insulated bag (1) according to any of the preceding embodiments further comprising at least one compartment (28) located on the body inner surface (22) and/or on the lid inner surface (42).

A38. An insulated bag (1) according to the preceding embodiment wherein the compartment (28) is adapted to hold a heating and/or cooling element.

A39. An insulated bag (1) according to the preceding embodiment wherein the compartment (28) is adapted to conceal the heating and/or cooling element.

A40. An insulated bag (1) according to any of the preceding embodiments comprising a volume of 50 to 80 liters.

A41. An insulated bag (1) according to any of the preceding embodiments comprising a length of about 30 to 80 cm, preferably 30 to 70 cm, more preferably about 35 to 50 cm.

A42. An insulated bag (1) according to any of the preceding embodiments comprising a width of about 20 to 70 cm, preferably 20 to 60 cm, more preferably 30 to 50 cm.

A43. An insulated bag (1) according to any of the preceding embodiments comprising a height of about 20 to 60 cm, preferably 20 to 50 cm, more preferably 30 to 50 cm.

A44. An insulated bag (1) according to any of the preceding embodiments further comprising at least one separating wall (50) adapted to removably attach to the bag body (2) of the insulated bag (1).

A45. An insulated bag (1) according to the preceding embodiment wherein the separating wall (50) can be attached at least one of horizontally and vertically.

A46. An insulated bag (1) according to any of the preceding embodiments and with features of embodiment A44 wherein the insulated bag (1) comprises at least two separating walls (50) and wherein at least one wall (50) is removably attached vertically and at least one wall (50) is removably attached horizontally.

A47. An insulated bag (1) according to any of the preceding embodiments further comprising a sensor adapted to measure at least one of temperature and humidity inside the insulated bag (1).

Below is a list of system embodiments. Those will be indicated with a letter "S". Whenever such embodiments are referred to, this will be done by referring to "S" embodiments.

S1. A mobile robot (1000) adapted to deliver temperature-sensitive items to recipients, said robot (1000) comprising a robot body (1010) comprising a robot item space (1030); a robot lid (1040) adapted to assume at least an open and closed positions and wherein
  the robot lid (1040) is adapted to fit on top of the robot body (1010) in the closed position, so as to cover the robot item space (1030); and
  the robot lid (1040) is adapted to be lifted to the open position, so as to allow access to the robot item space (1030);
an insulated bag (1) adapted to be fitted within the robot item space (1030), said insulated bag (1) comprising
  a bag body (2) comprising a body inner surface (22), a body outer surface (24) and a body cavity (26);
  a bag lid (4) comprising a lid inner surface (42) and a lid outer surface (44) adapted to assume at least an open and a closed positions and wherein
    the bag lid (4) is adapted to snugly fit on top of the bag body (2) in the closed position, so as to cover the body cavity (26); and
    the bag lid (4) is adapted to be lifted to the open position, so as to allow access to the body cavity (26);
and wherein
  the bag lid (4) is adapted to assume an open position when the robot lid (1040) assumes an open position; and
  the bag lid (4) is adapted to assume a closed position when the robot lid (1040) assumes a closed position.

S2. A system according to the preceding embodiment wherein the robot (1000) is an autonomous and/or semi-autonomous robot.

S3. A system according to any of the preceding system embodiments wherein the robot (1000) is adapted to navigate on pedestrian walkways.

S4. A system according to any of the preceding system embodiments wherein the robot (1000) including the load weighs no more than 40 kg.

S5. A system according to any of the preceding system embodiments wherein the robot (1000) is adapted to travel with a speed of no more than 20 km/h, or no more than 15 km/h, or no more than 10 km/h, preferably between 3 and 8 km/h or, more preferably, between 3 and 5 km/h.

S6. A system according to any of the preceding system embodiments wherein the robot (1000) comprises the following dimensions: width of 40 to 70 cm, such as about 55 cm, height of 40 to 70 cm, such as about 60 cm, length of 50 to 80 cm, such as about 65 cm.

S7. A system according to the preceding embodiment wherein the robot (1000) further comprises at least four wheels, preferably at least six wheels.

S8. A system according to the preceding embodiment wherein the robot (1000) further comprises a lock comprising at least one unlocked and at least one locked configurations and wherein
  in the open configuration, the robot lid (1040) can be lifted so as to allow access to the item space (1030); and
  in the closed configuration, the robot lid (1040) cannot be lifted without damaging the lid (1040) and/or the robot body (1010) and/or the lock.

S9. A system according to any of the preceding system embodiments wherein the robot lid (1040) is adapted to open when the mobile robot (1000) reaches the item recipient.

S10. A system according to any of the preceding system embodiments further comprising a container (100) adapted to be fitted within the robot item space (1030) and adapted to fit the insulated bag (1).

S11. A system according to the preceding embodiment wherein the container (100) comprises a rigid basket.

S12. A system according to any of the preceding system embodiments wherein the robot lid (1040) comprises a robot lid inner surface (1042) and wherein the insulated bag (1) further comprises a securing element (40) adapted to attach the bag lid (4) to the robot lid inner surface (1042).

S13. A system according to any of the preceding system embodiments and with feature of embodiment A47 wherein the sensor is further adapted to send its measurements to the robot (1000) for processing.

S14. A system according to the preceding embodiment wherein the robot (1000) is adapted to send out an alert signal if the sensor's measurements are not within predefined ranges.

S15. A system according to any of the preceding system embodiments wherein the insulating bag (1) is according to any of the embodiments A1 to A46.

Below is a list of use embodiments. Those will be indicated with a letter "U". Whenever such embodiments are referred to, this will be done by referring to "U" embodiments.

U1. Use of an insulating bag (1) and/or a mobile robot (1000) according to any of the preceding embodiments for reducing heat exchange between temperature sensitive items and the ambient surroundings.

U2. Use according to the preceding embodiment further comprising reducing heat exchange between the items stored in the insulated bag (1) in the mobile robot (1000) and the ambient surroundings during delivery of said items from a first location to at least one delivery location by the mobile robot (1000).

The present technology will now be discussed with reference to the accompanying drawings.

DESCRIPTION OF EMBODIMENTS

Figure 1A:
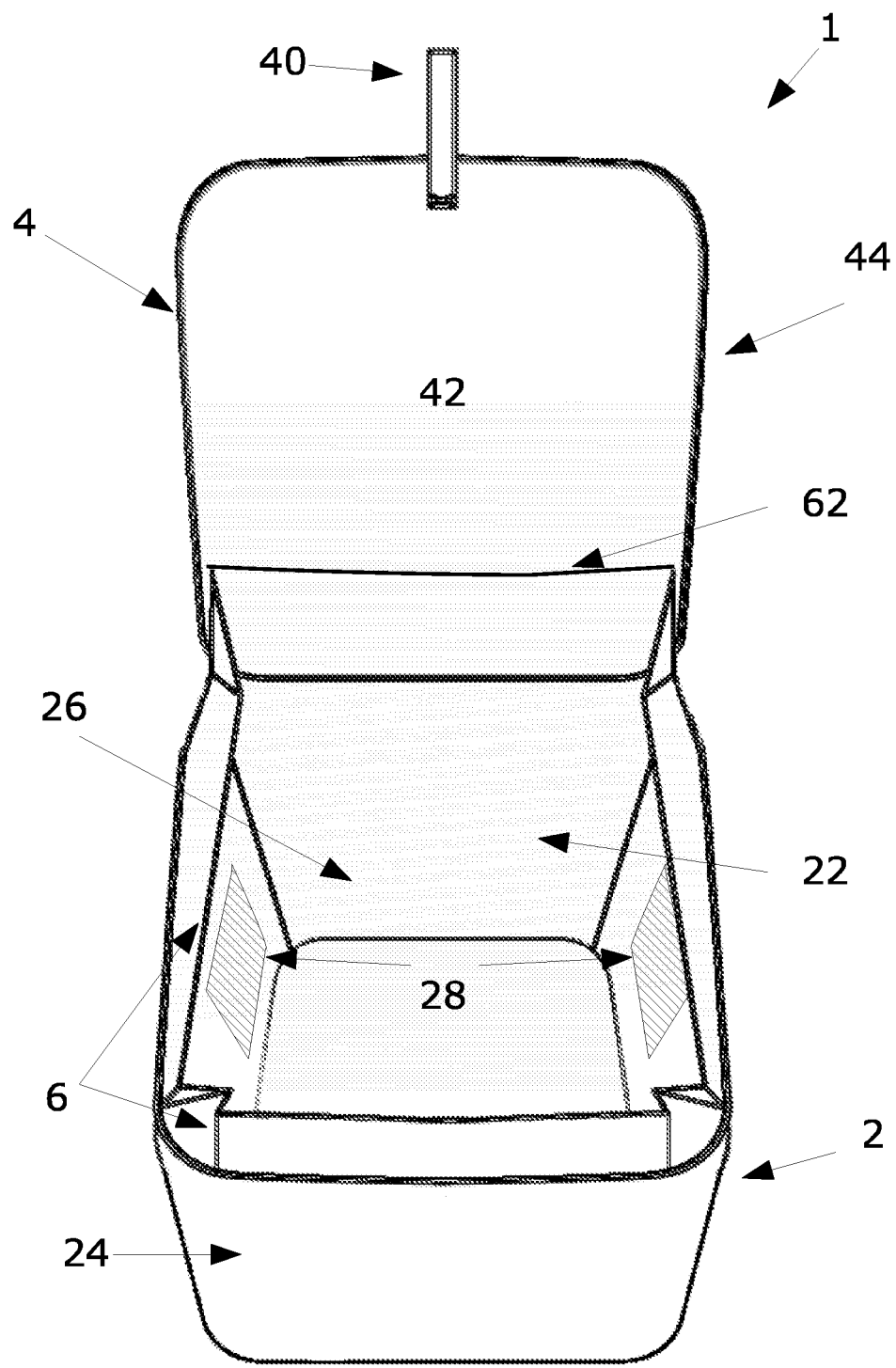
FIG. 1a shows a perspective view of an embodiment of the insulated bag according to one aspect of the invention.

FIG. 1*a* depicts an embodiment of the insulated bag 1 according to one aspect of the invention. The insulated bag 1 can be used, for example, in the context of a mobile robot, preferably an autonomous delivery robot operating on walkways, sidewalks and other pedestrian paths. The mobile robot can comprise a item space such as a compartment or multiple compartments within which deliveries can be transported to their destination. The insulated bag 1 can be placed within the delivery robot's item space if it is intended to transport temperature sensitive items such as groceries, meals, take-out and/or beverages. As the delivery robot can also be used to transport non-temperature sensitive items, it can be particularly advantageous to have an insulation system that can be easily inserted within such a delivery robot and then retrieved from it. The insulated bag 1 can be preferably flexible or pliant. Since it is intended to be placed within a delivery robot, there is no need for the insulated bag 1 to be rigid. In fact, that can be detrimental, as it would need to be manufactured more accurately to fit within the item space of the delivery robot. A flexible bag can have a larger margin of error in terms of fitting within the item space, and can easier fit snugly to avoid friction between the walls or movement within the item space.

The insulated bag 1 can comprise a bag body 2 formed by four walls and a floor, and a bag lid 4. The bag body 2 comprises a body inner surface 22 and a body outer surface 24. That is, the bag body 2 comprises a cavity 26 between the four walls and the floor of the bag body 2 with respect to which the body inner surface 22 and the body outer surface 24 are defined. Similarly, the bag lid 4 comprises a lid inner surface 42 and a lid outer surface 44, so that the lid inner surface 42 faces the cavity 26, and the lid outer surface 44 faces the outside of the insulated bag 1. The cavity 26 can comprise temperature sensitive items being transported for delivery.

The bag body 2 can further comprise compartments 28, located in this embodiment on the body inner surface. The compartments 28 can comprise chambers, hollows, sockets or pockets, and are intended to house cooling or heating packs and/or elements. The insulated bag 1 is intended to comprise passive means of temperature control—such as, for example, ice packs and/or heating pads. In some other embodiments, the compartments 28 can also house active cooling or heating means such as electrical and/or chemical temperature regulation elements. In some preferred embodiments, Peltier elements can be used. The compartments 28 do not have to be located on the sides of the body inner surface 22. There can be one or a plurality of compartments 28 scattered within the bag body 2. For example, one or more compartments 28 can be located on the lid inner surface 42, on any of the interior walls of the bag body 2 or on its floor. Compartments 28 can be manufactured in such a way as to mask the cooling/heating means comprised within them. This can be particularly advantageous for aesthetic purposes, as well as for preventing the recipient from removing the cooling/heating means. Furthermore, this can shield the cooling/heating means from any spillage occurring within the body cavity 26. Compartments 28 can be manufactured of the same material as the one comprising the body inner surface 22 (described in more detail in descriptions for FIGS. 1*b* and 4). In a rather simple embodiment, compartments 28 can comprise pockets on the body inner surface 22 and/or lid inner surface 42.

The insulated bag 1 can further comprise flaps 6 located around the edge of the cavity 26. When the bag lid 4 is closed over the cavity 26, the flaps 6 can unfold so as to partially extend over the cavity 26 between the lid inner surface 42 and the cavity 26. When the bag lid 4 is opened, as in FIG. 1*a*, the flaps 6 can be folded in such a way as to mostly not obstruct the cavity 26 (or obstruct it less than in the unfolded position). That is, the flaps 6 are manufactured in such a way as to fold (or at least partially fold) upward as the bag lid 4 rises and to unfold (or at least partially unfold) outward as the bag lid 4 lowers. This can, for example, be achieved by attaching the flaps 6 to the lid inner surface 42 via connection 62 (that may also be referred to as seam 62 and/or stitching 62). That is, connection 62 can refer to the flaps 6 being glued and/or stitched onto and/or otherwise attached to the lid inner surface 42. The flaps 6 can reinforce insulation around the edges of the cavity 26. The bag lid 4 can be manufactured to fit snugly onto the bag body 2 when in a closed state, so that it is not dislodged during transport. However, in the absence of other attachment means such as for example a zipper around the bag lid 4, there can be increased heat transfer at the edges between the bag body 2 and the bag lid 4. The flaps 6 serve to minimize this increased heat transfer by presenting another barrier to heat entering or exiting the cavity 26 near its edges. As the present invention also aims to facilitate access to the cavity 26, it would be disadvantageous to have a zipper or another firm fastening means between the bag lid 4 and the bag body 2.

Figure 3:
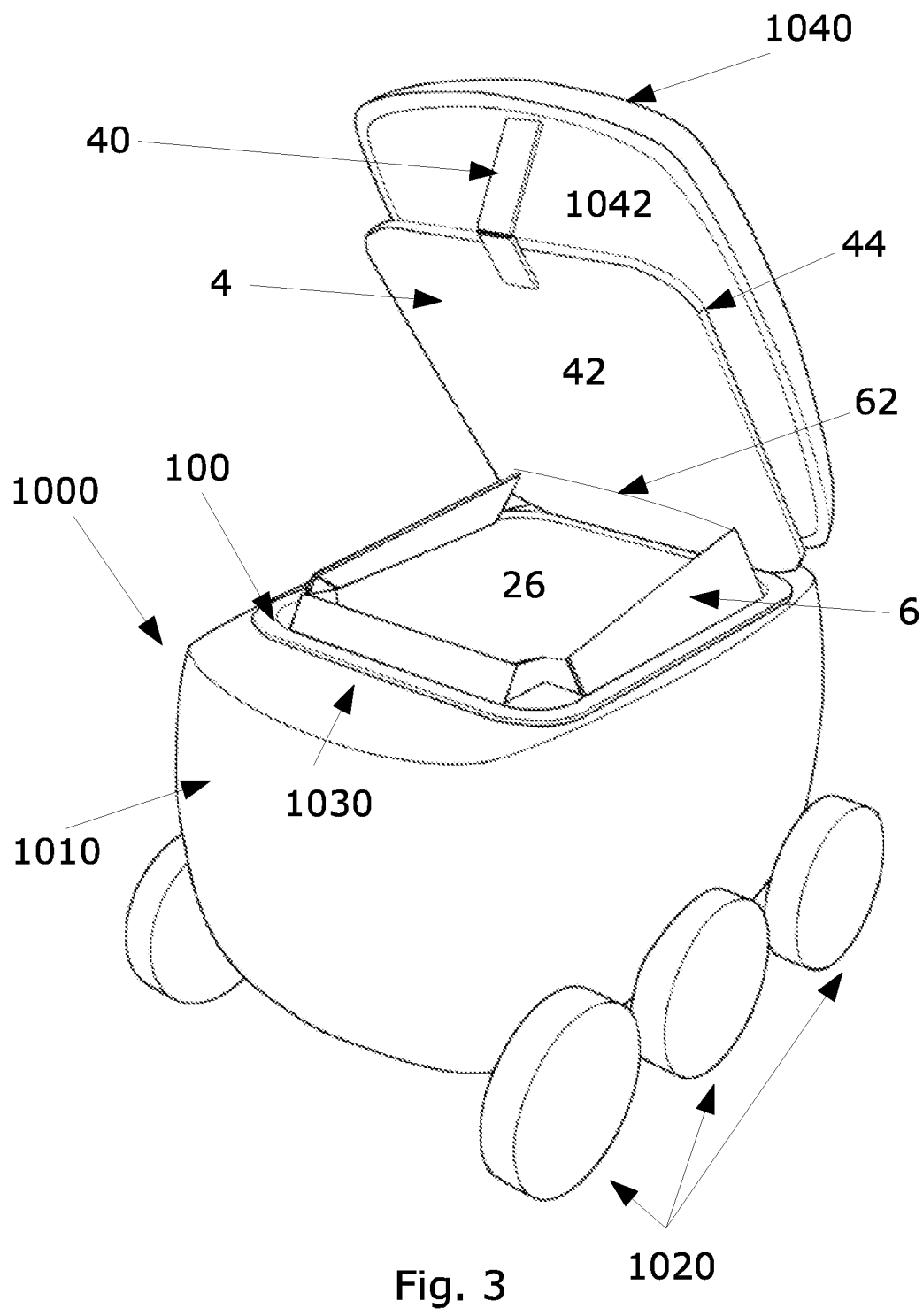
FIG. 3 shows a perspective view of an embodiment of the insulated bag fitted into a rigid container fitted into a mobile robot according to one aspect of the invention.

The bag lid 4 can also comprise a securing element 40. The securing element 40 can be adapted to secure or attach the bag lid 4 to another surface, such as the robot lid inner surface 1042 of a robot lid 1040 as seen in FIG. 3, so that when the other surface rises, so will the bag lid 4. For example, in the context of the insulated bag 1 being used within a delivery robot, the securing element can serve to attach the bag lid to the inner surface of the robot's lid. The securing element 40 is particularly advantageous, as it allows the recipient to open both the outer robot lid and the insulated bag lid 4 with one motion. Additionally or alternatively, the robot lid can open automatically upon reaching the recipient and pull up the bag lid 4 with it as well. The securing element 40 can comprise a VELCRO®-based attachment means, a button, tape, a suction cup, magnet and/or other means of attachment. This is further discussed in relation to FIG. 5.

The insulated bag 1 can comprise a volume of 30 to 100 l, preferably 50 to 80 l, even more preferably 60 to 70 l. The length of the insulated bag 1 can comprise 30 to 80 cm, preferably 30 to 70 cm, more preferably about 35 to 50 cm. The width of the insulated bag 1 can comprise 20 to 70 cm, preferably 20 to 60 cm, more preferably 30 to 50 cm. The height of the insulated bag 1 can comprise 20 to 60 cm, preferably 20 to 50 cm, more preferably 30 to 50 cm.

Figure 1B:
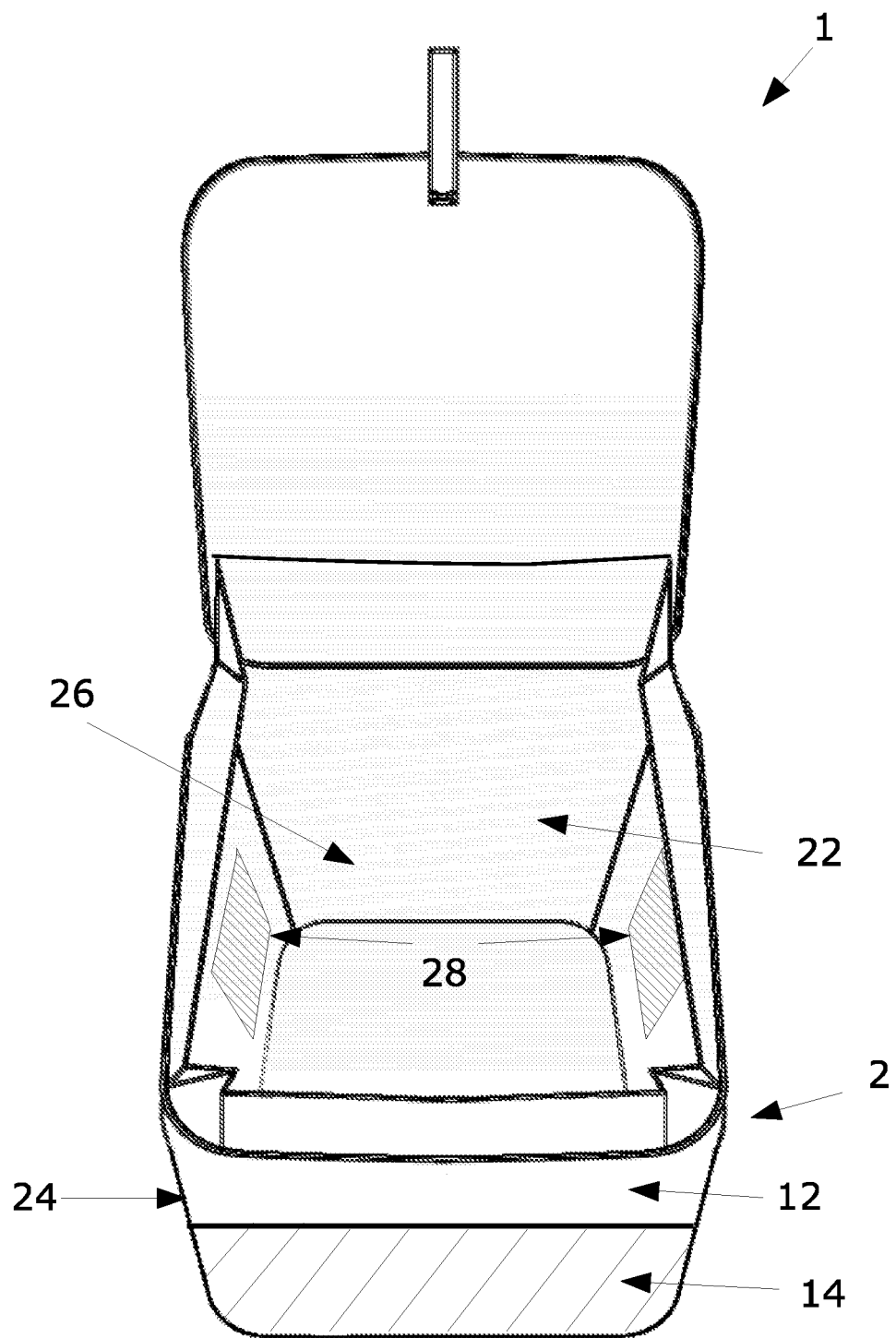
FIG. 1b shows a perspective view of an embodiment of the insulated bag with an easily removable outer layer according to one aspect of the invention.

FIG. 1*b* depicts a similar embodiment of the isolated bag 1 according to one aspect of the invention. The difference with respect to FIG. 1*a* is a visible boundary between an outer layer 12 and an intermediate layer 14. In the case depicted in FIG. 1*b*, the outer layer 12 does not extend all around the insulated bag, but covers only a portion of it (such as a fourth, a third, a half or so). That is, the outer layer 12 covers the body inner surface 22 of the insulated bag 1 and extends over a part of the body outer surface 24. This is particularly advantageous, as it allows for quick placement and removal of the outer layer 12 on the bag body 2 of the insulated bag 1. That is, the outer layer 12 can be removable, preferably easily removable.

The outer layer 12 can, in some embodiments, only cover the body inner surface 22. In such embodiments, it can be attached to the insulated bag by, for example, elastic attaching elements such as elastic bands.

In other embodiments, the outer layer 12 can comprise a plurality of different materials stitched or otherwise attached together. For example, a material such as nylon can be used for the body inner surface 22, and an elastic synthetic material can be used for the body outer surface 24. This can be particularly advantageous, as an elastic or stretchy material can be easier to put on and take off the insulated bag 1.

The outer layer 12 can comprise, for example, a polymer material such as polyamide nylon, polypropylene or polyester. Note, that compartments 28 can similarly be manufactured out of a polymer material such as polyamide, nylon, polypropylene or polyester either as an integral part of the inner body inner surface 22 and/or as additional elements sewn or otherwise attached to it. The outer layer 12 can comprise an antibacterial nylon, for example, nylon coated with silver.

As previously mentioned, spillage can occur within the insulated bag 1. Even if no visible food or drink constituents are present in the insulated bag 1, it should be regularly cleaned to conform with health and safety regulations. Therefore, it is particularly advantageous to be able to quickly remove or replace the outer layer 12. As the isolated bag 1 is preferably intended for use in conjunction with a delivery robot, and would be inserted within its item space, the boundary between the outer layer 12 and the intermediate layer 14 would not be visible to the recipient, as it would be masked by the walls of the robot's item space. This is also advantageous for aesthetic purposes, as the outer layer 12 can then be made attractive and aesthetically pleasing and the intermediate layer can remain purely functional. In some embodiments, the outer layer 12 can be further coated with a hydrophobic polymer. This can be particularly advantageous on the bag inner surface 22 to minimize the effect of food spillage.

Note, that in some embodiments, the outer layer 12 can comprise different materials lining the body inner surface 22 and the body outer surface 24. For example, a polymer such as nylon can cover or line the body inner surface 22, and a low static elastic material such as a cotton-based material can cover or line the body outer surface 24.

Furthermore, an attaching mechanism such as a zipper can be placed on the outer layer 12, so that the part of the outer layer 12 covering or lining the body inner surface 22 can be even more easily removed and washed (or otherwise cleaned and/or disinfected). Such a mechanism can also comprise VELCRO®, buttons or other attachment means.

Figure 2A:
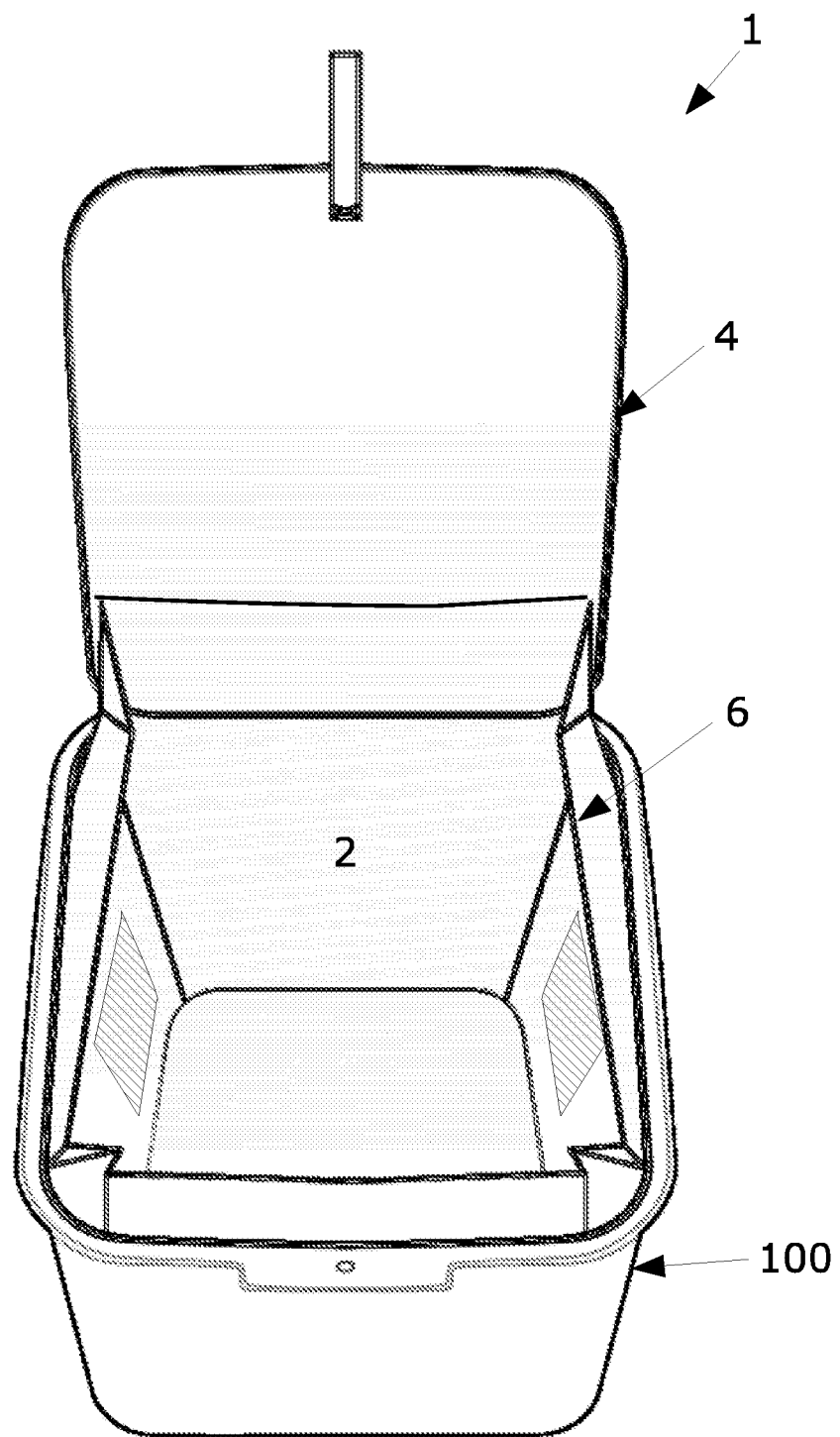
FIG. 2a shows a perspective view of an embodiment of the insulated bag fitted into a rigid container according to one aspect of the invention.
Figure 2B:
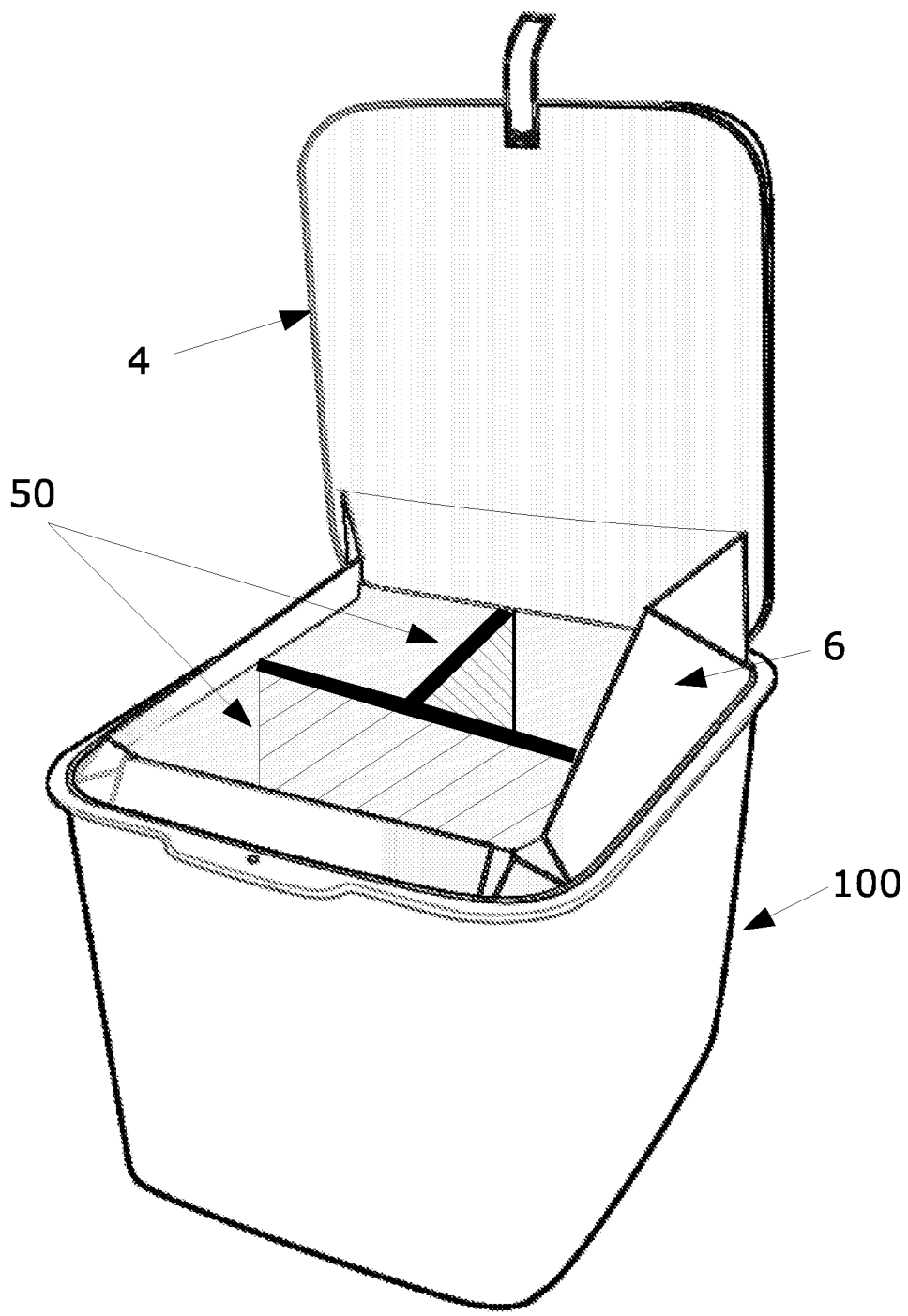
FIG. 2b shows another perspective view of the embodiment of the insulated bag fitted into a rigid container according to one aspect of the invention.

FIGS. 2a and 2b show two embodiments of the insulated bag 1 placed within a container 100. The container 100 can be placed within a delivery robot's item space (as further illustrated in FIG. 4). Note, that the container 100 is optional, and is only present in some embodiments of the present invention. The container 100 can be a rigid plastic container. In some embodiments, container 100 comprises a basket 100 and/or a bin 100. It can be manufactured in a standard way and used for both temperature-sensitive and non-temperature-sensitive items. The container 100 can, for example, be used to store items before loading them into a delivery robot directly with the container. The container 100 can be particularly advantageous to use in the present context, as it can present a barrier between the delivery robot's item space and its other components such as electronics and/or sensors. Furthermore, the container 100 can present another barrier between any food or drinks within the insulated bag 1 and the delivery robot. That is, if a substantial spillage occurs within the insulated bag 1 that permeates to the body outer surface 24 (not shown here), the container 100 can shield the delivery robot from such a spillage. Even further, the container 100 can be fixed to the delivery robot, so as to prevent the recipient and/or third parties from accessing the delivery robot's other components via the item space.

FIG. 2b also shows a separating wall 50. The insulated bag 1 can comprise one or more separating walls 50. Separating walls 50 can be removable (for example, they can attach to the insulated bag 1 via VELCRO® and/or buttons and/or tape. The separating walls 50 can serve to separate the individual items placed within the insulated bag 1 from each other. For example, the separating walls 50 can separate the "drinks" section from the "food" section so as to avoid contamination and/or moisture exchange between the two. The insulated bag 1 can comprise a plurality of separating walls 50, such as two separating walls 50. For example, one separating wall 50 can be arranged horizontally, to separate a "grocery" section from a "meal" section. A further separating wall can then be arranged vertically on one of the resulting levels (with this second wall 50 comprising different dimensions with respect to the first wall 50), to separate a further "meal" and "drinks" section. The sections are exemplary only, as the insulating bag can comprise a variety of items to be delivered.

FIG. 3 shows an embodiments of the insulated bag 1 placed within a container 100 that is itself placed within a mobile robot 1000. Note, that the present disclosure also encompasses embodiments where the insulated bag 1 is directly placed within the mobile robot 1000 without the container 100 in-between. However, it can be advantageous to include the container 100 as illustrated in FIG. 3 and explained in relation to FIGS. 2a and 2b. The mobile robot 1000 comprises a robot body 1010, that can also be referred to as a frame 1010. It can be preferably made of plastic for weight and cost reasons. The mobile robot 1000 further comprises wheels 1020. In the present depiction, there are six wheels 1020, but the number can be anywhere between two and eight wheels 1020. The mobile robot 1000 is a land-based robot and can be particularly adopted for operation on walkways, sidewalks and other pedestrian paths.

The mobile robot 1000 further comprises item space 1030. The item space 1030 can be covered via a robot lid 1040. The robot 1000 can further comprise a lock such as an electronic lock (not shown) that can lock the lid 1040 to the robot body 1010 and prevent unauthorized persons from accessing the item space 1030. The container 100 is placed within the item space 1030 of the mobile robot 1000. The insulated bag 1 is placed within the container 100. The items that the mobile robot 1000 can transport to their recipients can be placed within the insulated bag 1.

As discussed previously, flaps 6 can be adapted to rise when the bag lid 4 rises and lower to a substantially horizontal position when the bag lid 4 is lowered. This can be achieved partially by connection 62 attaching the flaps 6 to the lid inner surface 42 of the bag lid 4, and partially by adding particular folds to flaps 6. When the bag lid 4 is closed, the flaps 6 can partially extend over the cavity 26 of the insulated bag 1, providing further thermal insulation particularly over the areas below where the bag lid 4 snugly fits onto the bag body 2.

Securing element 40, shown in the present figure as attached to lid inner surface 42, can be fastened on robot lid inner surface 1042. Note, that other combinations are also possible, such as securing element 40 being attached to lid outer surface 44. The attachment need not be very strong, as it should only be able to maintain the gravitational force acting on bag lid 4 as the robot lid 1040 is lifted and any potential forces arising from the mobile robot 1000 travelling to the recipient. The securing element 40 has the purpose of lifting the bag lid 4 when the robot lid 1040 is either automatically raised or lifted by a recipient and/or other authorized person. In this way, the recipient need only reach into the cavity 26 of the insulated bag 1 and retrieve their item in one motion, as opposed to opening two lids and potentially unzipping the bag lid 4 on the way to their item. Note, that the securing element 40 preferably comprises a certain minimum length such as at least 1 cm, preferably at least 2 cm, more preferably at least 3 cm. This can be advantageous for the following reason. When the robot lid 1040 and the bag lid 4 are both in the closed position, there may be some space between the lid outer surface 44 and robot lid inner surface 1042. This space can be there to provide further insulation and/or simply to provide extra maneuverability (as in the case of tight fits between both lids, there may be less flexibility for any size differences due to manufacture). Therefore, to allow the bag lid 4 to snugly fit onto the bag body 2 and not have it lifted slightly above the cavity 26 when the robot lid 1040 is closed, the securing element 40 can comprise a certain minimum length.

In the embodiment shown, it can be particularly advantageous for the outer layer 12 to comprise a low static material on the body outer surface 24 (not shown in this figure). As the mobile robot 1000 moves with the insulated bag 1 inside, the resulting vibration can contribute to the build-up of static electricity between the insulated bag 1 and the robot 1000 (or between the insulated bag 1 and the container 100 if it is present). If an electrostatic discharge (ESD) occurs, it can damage or even disable some of the sensitive electronic components that the robot 1000 comprises (such as navigation and localization sensors, processing and communication components and so on). This can be potentially disastrous, as the robot can be disabled and unable to continue with the delivery. A similar situation can occur when the insulated bad 1 is placed inside the robot 1000 or removed from it. To avoid the dangerous ESD, the body outer surface 24 can be lined or covered with an anti-static or at least a low static material. For example, natural fibers such as cotton or cotton-based material can be used.

The mobile robot 1000 can weight no more than about 40 kg including the insulated bag 1 and any items the robot carries. The mobile robot 1000 can be adapted to travel with a speed of no more than 20 km/h, or no more than 15 km/h, or no more than 10 km/h, preferably between 3 and 8 km/h or, more preferably, between 3 and 5 km/h.

In one particular embodiment, the dimensions of the robot 1000 can be as follows. Width: 40 to 70 cm, such as about 55 cm, height: 40 to 70 cm, such as about 60 cm, length: 50 to 80 cm, such as about 65 cm.

Figure 4:
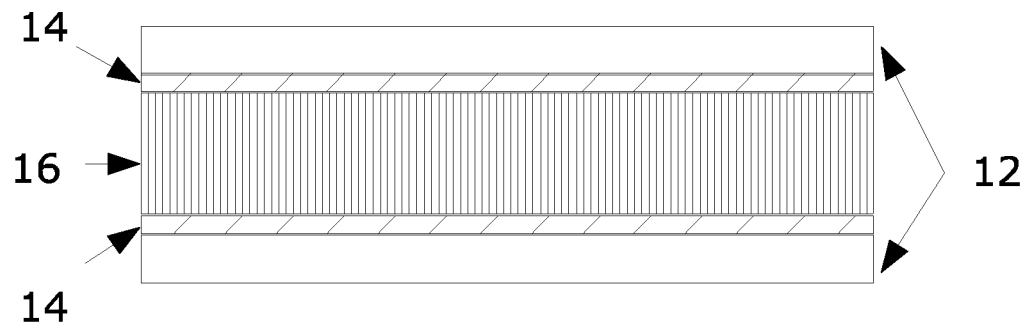
FIG. 4 shows a schematic cross-section of one embodiment of the layers of the insulated bag according to one aspect of the invention.

FIG. 4 schematically illustrates one possible embodiment of the layers of the insulated bag 1 according to one aspect of the invention. The bag body 2, the bag lid 4 and/or the flaps 6 can comprise all or some of the shown layers. In a preferred embodiment, at least the bag body 2 and the bag lid 4 comprise all of the layers shown in the figure.

Heat transfer can generally occur via conduction, convection and radiation. The three layers shown in the figure are optimized to minimize heat transfer via all three of those channels. Thermal conductivity refers to the process where heat is transferred by contact between two media with different temperatures due to collisions between their respective constituent atoms. The rate of heat flow through a particular material can be quantified by the following relation:

$$q = \frac{kA(T_2 - T_1)}{d},$$

where q is the heat flow rate (heat conducted per time unit, measured in Watts), k is the thermal conductivity of the material in question, A is the area, $T_2$ and $T_1$ are the respective temperatures outside and inside the material, and d is its thickness. Therefore, materials with lower thermal conductivity let less heat pass through them, and are better insulators.

Convective heat transfer refers to transfer of heat due to the movement of fluids such as gases or liquids. In the present case, convection can play a role within the cavity 26 (not shown here) of the insulated bag 1, but not a large role in heat transfer between the cavity 26 and the outside surroundings.

Radiative heat transfer refers to heat carried by thermal radiation emitted by bodies. Radiative heat transfer emitted by a blackbody can be quantified by Boltzmann law:

$$q = \sigma T^4 A$$

where q is the heat transfer rate (again, in Watts), $\sigma = 5.6703 \times 10^{-8}$ (W/m$^2$K$^4$) is the Stefan-Boltzmann constant, T is the temperature of the body in Kelvin in question and A is its surface area in squared meters. For materials that are not blackbodies, the relation is modified by the wavelength-dependent quantity called the "emissivity" as follows:

$$q = \epsilon \sigma T^4 A$$

where $\epsilon$ is the emissivity that can range between 0 and 1 depending on the material and on the wavelength of emitted radiation. Here, the lower the emissivity, the less radiation emitted by a material. Furthermore, it is possible to reflect the emitted radiation back, by using a layer of a material with a high reflexivity (or reflectance). Overall, effective insulating materials in this case would comprise a low thermal conductivity minimizing conductive heat transfer and a reflective layer minimizing radiative heat transfer.

With this in mind and referring to FIG. 4, the following layers are preferably comprised within the insulated bag 1. Outer layer 12 can comprise a polymer material such as polyamide, nylon, polypropylene or polyester. Preferably, the outer layer 12 comprises nylon. This is particularly advantageous both for insulation (as an extra outer layer 12 with air in-between it and the following layer contributes to conductive insulation), as well as for removing this layer for hygienic and/or cleanliness purposes (as described above). Such a layer can also be manufactured in an aesthetically pleasing way to better conform to the recipient's expectations.

Intermediate layer 14 can comprise a layer of thermally reflective material placed directly on inner layer 16. That is, the intermediate layer 14 can comprise a thin, preferably metallic layer coated and/or laminated on the inner layer 16. The intermediate layer 14 can comprise, for example, metals and/or metallic foils and/or metallic paints such as aluminum, nickel, silver and/or other metallic bases.

The inner layer 16 can comprise a thicker layer than the other two, manufactured of material with a low thermal conductivity. For example, the inner layer 16 can comprise a foam-based material. Preferably, the material of the inner layer 16 comprises a thermal conductivity k of between 0.01 and 0.1 W/mK (Watts per meter and degree Kelvin). More preferably, the thermal conductivity k comprises between 0.02 and 0.06 W/mK. Even more preferably, the thermal conductivity of the inner layer 16 lies between 0.03 and 0.04 W/mK. The thermal conductivity of the inner layer 16 can be at least 0.01 W/mK, preferably at least 0.02 W/mK, even more preferably at least 0.03 W/mK. The thermal conductivity of the inner layer 16 can be at most 0.1 W/mK, preferably at most 0.06 W/mk, even more preferably at least 0.04 W/mK.

The thickness of the inner layer can be between 1 and 10 mm, such as between 2 and 8 mm, such as between 3 and 7 mm, preferably around 5 mm. Such a thickness is a result of optimization between larger thickness leading to better insulation, and smaller thickness leading to more space within the cavity 26 of the insulated bag 1. A thickness value around 5 mm is particularly advantageous in that it assures sufficient insulation while not taking up excessive space.

In some other embodiments, the preferred thickness of the inner layer 16 can be between 10 and 40 mm, such as between 20 and 30 mm, preferably around 30 mm. This increased thickness can guarantee increased insulation and slower heat exchange with the ambient surroundings. In some embodiments, a plurality of versions of the insulated bag 1 can be used with different thickness of the inner layer 16. Depending on the items to be placed within the insulated bag 1, different versions can be used. That is, for more temperature-sensitive items, insulated bags 1 with thicker inner layers 16 can be used and vice versa.

In some embodiments, the insulated bag can comprise a plurality of inner layers 16, such as two inner layers 16. The two inner layers can be connected or otherwise attached together (for example by tape or by other attaching means). This can be more advantageous than one thicker inner layer 16, as the air between the two inner layers 16 can contribute to the insulation. Furthermore, it can be easier, more efficient and less energy consuming to manufacture or procure thinner inner layer 16 material and stack it as desired rather than manufacture or procure thicker inner layer 16.

In some other preferred embodiments, the inner layer 16 can comprise aerogel or similar materials. In some other embodiments, the insulated bag 1 can even comprise a vacuum insulated layer. In this case, however, the insulated bag 1 needs to be rigid, which can be disadvantageous.

Note, that the bag body 2, bag lid 4 and flaps 6 may not all comprise all of the outer, intermediate and inner layers 12, 14, 16 respectively. Further, in some embodiments, the composition and/or thickness of the different layers is different for the bag body 2, bag lid 4, and flaps 6. For example, the bag lid 4 can comprise a thicker layer of the inner layer 16 than the bag body 2. In embodiments where the insulated bag 1 is used within a mobile robot 1000 (as shown in FIG. 3), the bag lid 4 can be separated from the ambient surroundings only by the robot lid 1040. In such embodiments, it can be particularly advantageous to provide a thicker inner layer 16 to the bag lid 4 than to the bag body 2 (which can be additionally insulated on the sides by the robot body 1010). Additionally or alternatively, the bag lid 4 can comprise a different insulating material than the bag body 2. For example, the inner layer 16 of the bag body 2 can comprise polyethylene or a similar material, and the inner layer 16 of the bag lid 4 can comprise aerogel or a similar material.

Furthermore, other considerations relating to the specific use of the insulated bag 1 can arise. Again, consider the case where the insulated bag 1 is used within the mobile robot 1000 (see FIG. 3). In some embodiments, the mobile robot 1000 can comprise a battery. Said battery can be placed within the body 1010 of the mobile robot 1000. For example, the battery can be placed towards the bottom of the robot 1000, that is, under the insulated bag 1. Often, batteries emit heat during normal use. This heat can be transferred to the contents of the insulated bag 1. This is advantageous in the case where the items stored within the insulated bag 1 during delivery are hot or warm, as the extra source of heat can help maintain the temperature. In such a case, the lower surface of the bag body 2 of the insulated bag 1 can comprise a thinner inner layer 16. Conversely, if the items within the insulated bag 1 are cold or frozen, it can be disadvantageous to have an extra source of heat from the robot 1000 battery. In this case, the lower surface of the bag body 2 of the insulated bag 1 can comprise a thicker inner layer 16. As above, additionally to or instead of changing the thickness of the inner layer 16 for the bottom part of the bag body 2, the inner layer 16 could also comprise a different material for this part of the insulated bag 1.

Figure 5:
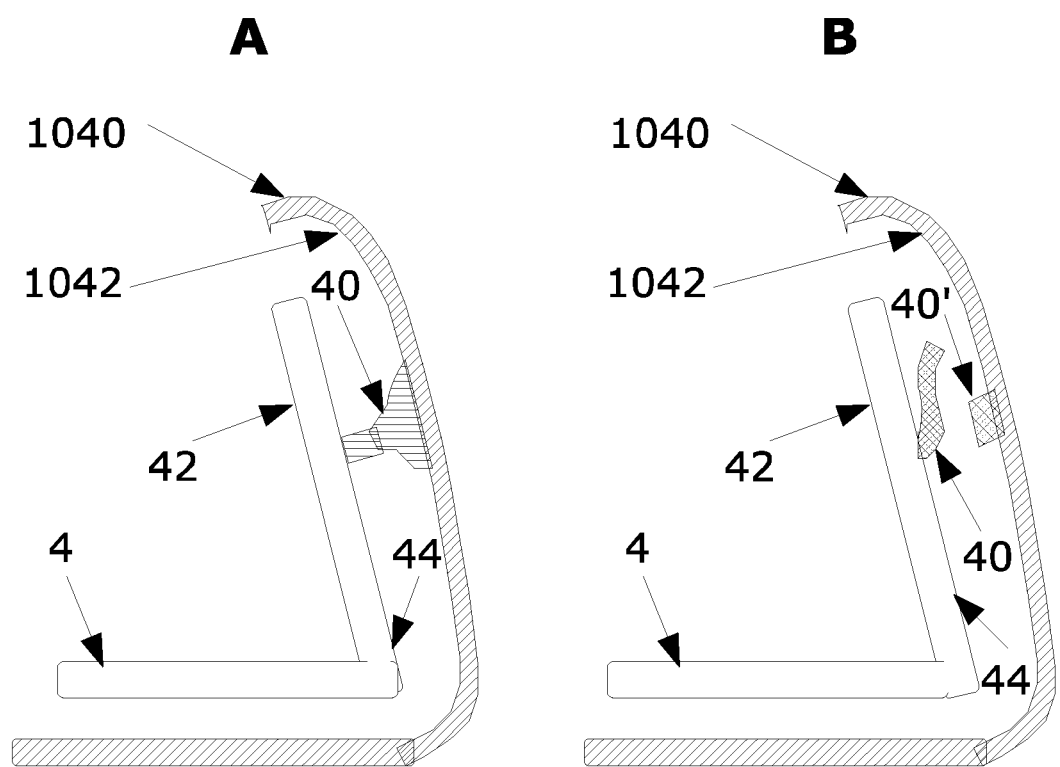
FIG. 5 shows two sketches of possible embodiments of securing element of the bag lid according to one aspect of the invention.

FIG. 5 schematically depicts two possible embodiments of securing element 40 according to one aspect of the invention. Both sketches show a side view of bag lid 4 and robot lid 1040 in an open position. In both sketches, the securing element 40 is fixed to lid outer surface 44, contrary to FIGS. 1-3, where the securing element 40 was fixed to lid inner surface 42. As demonstrated, either option is possible, and the decision to use one or the other can depend on the precise nature of the securing element 40 used.

Sketch A depicts an embodiment of the securing element 40 as a suction cup 40. The suction cup 40 is attached to the lid outer surface 44 by some means (such as gluing, stapling, fixing via an incision on the lid inner surface 42 and/or other means). The suction cup 40 can then be pressed onto robot lid inner surface 1042 with sufficient pressure to generate a pressure difference between the inside of the suction cup 40 and the ambient surroundings. The pressure difference then forces the cup to adhere to the robot lid inner surface 1042. There is a clear advantage to this version of securing element 40: there is no need for any part of it to permanently remain on the robot lid inner surface 1042, and therefore no need to further specialize the mobile robot itself, but rather only adding the securing element 40 on the insulated bag 1. However, the ability of the suction cup 40 to adhere to the robot lid inner surface 1042 depends on the material of said surface. Therefore, if a particularly porous material is used, the adherence may not work. In some embodiments, the suction cup 40 can be attached to a thread, cord, wire, ribbon, chain or string in order to extend it from the lid outer surface 44 to the robot lid inner surface 1042 (in case they are separated by a certain distance in the "closed" position).

Sketch B depicts an embodiment of the securing element 40' as a button 40' and/or VELCRO®-based fastener 40'. In this case, the securing element 40' can comprise a button, a push-button, a snap fastener and/or a VELCRO® fastener. The advantage of this configuration is that the attachment would work independently of the material of the lid outer surface 44 and robot lid inner surface 1042. The disadvantage is that both the lid outer surface 44 and the robot lid inner surface 1042 need to have part of the securing element 40' firmly attached to them.

Note, that both sketches allow for the securing element 40, 40' to also be attached to the lid inner surface 42 and reach the robot lid inner surface 1042 via a thread or a similar extension.

Another embodiment of securing element 40 can comprise simply a sticky tape of some form that is attached to both robot lid inner surface 1042 and one of lid inner surface 42 and lid outer surface 44.

Yet another embodiment of securing element 40 can comprise a strap on top of the bag lid 4 that is adapted to secure on a protrusion or another convex features such as a hook. Correspondingly, the strap can be present on the robot lid 1040, and the protrusion or another convex feature on the bag lid 4.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

LIST OF REFERENCE NUMBERS

Below is a list of the elements used when describing the embodiments of the invention.
1—insulated bag
2—bag body
4—bag lid
6—flaps
12—outer layer
14—intermediate layer
16—inner layer
22—body inner surface
24—body outer surface
26—body cavity
28—compartment
40—securing means
42—lid inner surface
44—lid outer surface
50—separating wall
62—connection
100—container
1000—mobile robot
1010—robot body
1020—wheels
1030—robot package space
1040—robot lid
1042—robot lid inner surface

What is claimed is:

1. A mobile food delivery robot (1000) configured to deliver food items, comprising:
   a robot body (1010) comprising a robot item space (1030) configured to receive food items for delivery;
   a robot lid (1040) adapted to assume at least open and closed positions, the robot lid having a robot lid inner surface (1042);
   an insulated bag (1) fitted within the robot item space (1030), said insulated bag (1) comprising a bag body (2) comprising a body inner surface (22), a body outer surface (24) and a body cavity (26);
   wherein:
      the robot lid (1040) is adapted to fit on top of the robot body (1010) in the closed position, so as to cover the robot item space (1030) with the robot lid inner surface (1042) facing the body cavity (26), to thereby prevent access to the body cavity (26); and
      the robot lid (1040) is adapted to be lifted to the open position, so as to allow access to the robot item space (1030), with the robot lid inner surface (1042) no longer facing the body cavity (26).

2. The mobile food delivery robot according to claim 1, wherein the insulated bag has a length of 30 to 80 cm, a width of 20 to 70 cm and a height of 20 to 60 cm.

3. The mobile food delivery robot according to claim 1, wherein the bag body comprises at at least one compartment having a heating and/or a cooling element located therein.

4. The mobile food delivery robot according to claim 1, wherein the bag body comprises at least one separating wall within the body cavity.

5. The mobile food delivery robot according to claim 4, wherein the bag body's separating wall is adapted to removably attach to the inner surface of the bag body in at least one of horizontal and vertical configurations.

6. The mobile food delivery robot according to claim 1, wherein the bag body comprises at least one inner layer adapted to reduce conductive heat transfer between the body cavity and the ambient surroundings.

7. The mobile food delivery robot according to claim 6, wherein the bag body's inner layer comprises a foam-based material.

8. The mobile food delivery robot according to claim 6, wherein the bag body's inner layer comprises a material having a thermal conductivity of 0.03 to 0.05 W/mK.

9. The mobile food delivery robot according to claim 6, wherein the bag body further comprises at least one intermediate layer adapted to reduce radiative heat transfer between the body cavity and the ambient surroundings.

10. The mobile food delivery robot according to claim 9, wherein the bag body's intermediate layer is laminated on both sides of the inner layer.

11. The mobile food delivery robot according to claim 10, wherein the bag body further comprises an outer layer laminated on at least one side of the intermediate layer, the outer layer adapted to removed and/or replaced.

12. The mobile food delivery robot according to claim 11, wherein the bag body's outer layer comprises a polymer material covering the body inner surface and a low static elastic material covering the body outer surface.

13. The mobile food delivery robot according to claim 1, wherein the bag body comprises:
   at least one inner layer adapted to reduce conductive heat transfer between the body cavity and the ambient surroundings;
   at least one intermediate layer positioned on either side of the at least one inner layer, the at least one intermediate layer adapted to reduce radiative heat transfer between the body cavity and the ambient surroundings; and at least one outer layer positioned on each of said at least one intermediate layer, the at least one outer layer adapted to reduce radiative heat and further adapted to be removed and/or replaced, and wherein:

the inner, intermediate and outer layers are different from one another in material composition.

14. The mobile food delivery robot according to claim 1, wherein the insulated bag further comprises:

a bag lid comprising a lid inner surface and a lid outer surface, the bag lid connected to the bag body and adapted to selectively assume at least an open position and a closed position; and a securing element attached to the bag lid and adapted to releasably attach the bag lid to an overlying surface not belonging to the insulated bag, such that raising the overlying surface also raises the bag lid.

15. The mobile food delivery robot according to claim 14, wherein the securing element comprises a minimum length of at least 1 cm.

16. The mobile food delivery robot according to claim 14, wherein the securing element is adapted to withstand a force of at least 5 N before detaching from at least one of the bag lid and the overlying surface.

17. The mobile food delivery robot according to claim 14, wherein the securing element comprises elastic material.

18. The mobile food delivery robot according to claim 14, further comprising flaps attached to the body inner surface between the body cavity and the bag lid and wherein:

the flaps are adapted to at least partially cover at least part of the body cavity in the closed position of the bag lid; and the flaps are adapted to at least partially fold away from the body cavity in the open position of the bag lid.

* * * * *